United States Patent [19]
Wagner

[11] Patent Number: 5,271,341
[45] Date of Patent: Dec. 21, 1993

[54] EQUIPMENT AND PROCESS FOR MEDICAL WASTE DISINTEGRATION AND RECLAMATION

[76] Inventor: Anthony S. Wagner, 13709 Highway 71, West, Bee Caves, Tex. 78738-3112

[21] Appl. No.: 982,450

[22] Filed: Nov. 27, 1992

Related U.S. Application Data

[63] Continuation-in-part of Ser. No. 669,756, Mar. 15, 1991, Pat. No. 5,167,919, which is a continuation-in-part of Ser. No. 524,278, May 16, 1990, Pat. No. 5,000,101.

[51] Int. Cl.⁵ .............................................. F23G 7/04
[52] U.S. Cl. ...................................... 110/346; 588/201; 110/235; 110/250; 110/204
[58] Field of Search ............... 110/346, 235, 238, 250, 110/205; 422/184; 588/201; 432/161; 266/200, 216, 233

[56] References Cited

U.S. PATENT DOCUMENTS

| | | | |
|---|---|---|---|
| 3,295,960 | 1/1967 | Parlee et al. | 266/216 X |
| 3,765,346 | 10/1973 | Stockman | 110/204 |
| 3,841,239 | 10/1974 | Nakamura et al. | 110/250 |
| 4,666,696 | 5/1987 | Shultz | 423/659 |
| 4,886,001 | 12/1989 | Chang et al. | 110/346 |
| 4,957,048 | 9/1990 | Beer et al. | 110/235 |

FOREIGN PATENT DOCUMENTS 945824  4/1974  Canada .............................. 110/250

*Primary Examiner*—Albert J. Makay
*Assistant Examiner*—William C. Duerrler
*Attorney, Agent, or Firm*—Joseph F. Long

[57] ABSTRACT

A process and equipment for pyrolyzing packaged biomedical waste in a reactive metal alloy in an oxygen deficient atmosphere and separating for recycling the resultant carbon, glass, and metal while venting resultant hydrogen and nitrogen from an aqueous off gas scrubber.

10 Claims, 4 Drawing Sheets

EQUIPMENT AND PROCESS FOR MEDICAL WASTE DISINTEGRATION AND RECLAMATION

BACKGROUND

This application is a continuation-in-part of Ser. No. 07/669,756, filed Mar. 15, 1991 now U.S. Pat. No. 5,167,919 and entitled "Waste Treatment and Metal Reactant Alloy Composition." Ser. No. 07/669,756 is, in turn, a continuation-in-part of Ser. No. 524,278, filed May 16, 1990, now U.S. Pat. No. 5,000,101 entitled "A Hazardous Waste Reclamation Process."

This invention encompasses special equipment designed to disintegrate and separate useable materials from boxed medical waste using the reactant alloy composition as outlined in Ser. No. 07/669,756 modified to include only the necessary components for the particular waste to be treated.

The pyrolysis vessel of the invention is designed to:
a) heat a mixture of aluminum and the elements of iron, zinc, copper, and calcium as needed for a particular waste to produce a molten metal bath;
b) control burners operated with a minimum of combustion air to hold the molten bath at about 850° C.
c) allow moving sealed boxes to be automatically dumped, into and submerged in the molten bath;
d) have a minimum of oxygen contact the molten metal bath in the pyrolysis chamber by use of an inert gas purge;
e) subject all exhaust gas from the pyrolysis chamber to a minimum of 250° C. temperature;
f) send the pyrolysis chamber off gas through a scrubber to remove carbon and other particulate.

Heating is accomplished either using burners burning methane, propane, butane, etc., or using electrical induction heating.

At 850° C. all organic materials, including organic pathogens, are broken down into carbon and gaseous products. Negative ions such as chlorine, bromine, etc., in the organic compounds will react with the alloy and be held as non volatile salts. The carbon is separated in the process and may be used as carbon black or for fuel. Glass will melt and metal will dissolve or remain in the molten bath. Water in the form of steam will pass into the aqueous scrubber.

Periodically, the molten bath must be replaced in order to reclaim the metals. The molten bath may be allowed to drain out of the reactor or pumped into collection vessels for later use in the metal industry. Molten glass may skimmed off the surface of the molten alloy. Carbon formed is separated in the scrubbing system and resultant innocuous hydrogen and nitrogen is purged from the system.

SUMMARY OF THE INVENTION

The invention comprises equipment and process to pyrolyze packaged biomedical waste, in an atmosphere containing a minimum of oxygen. A two compartment pyrolysis unit with an underflow of a molten reactive alloy from a first firebox compartment into a second compartment wherein the packaged waste, with the preferred package being a sealed box, is submerged in the molten alloy in such a fashion that pyrolysis products come into intimate contact with the molten alloy. All the pyrolysis products must be heated to a minimum of 250° C. by contact with the alloy and/or the brick lining of the second chamber in order to destroy all pathogens. A dunking system with a ceramic coated plunger acts to submerse the package at the instant the manually fed package drops into the molten alloy. The face of the plunger is serrated in both directions to form narrow paths for the gaseous pyrolysis products to flow through the molten metal. The plunger is designed and operates to submerse the package, which crushes as it is submerged, to at least ½ inch below the molten alloy level.

In the pyrolysis chamber, glass products will melt and float on the surface. Stainless steel such as hypodermic needles will sink into and be dissolved in the molten alloy. Organic products such as towels, chemicals, etc., will break into their component elements with chloride, bromides, etc., reacting to form nonvolatile compounds with calcium in the alloy. Elemental carbon will be carried off in the off gas with gaseous nitrogen and hydrogen.

Instrumentation is provided to make certain that the off gas is heated to a minimum of 250° C., which destroys all pathogens.

The off gas is scrubbed in a recirculating aqueous scrubber. Carbon is removed in the scrubber and is separated for reclamation while the water is recycled to the scrubber. The scrubbed hydrogen and nitrogen is vented to the atmosphere.

Chlorine may be added to the circulating water in an amount to hold a residual chlorine of about one part per million as a precautionary measure to prevent pathogen leakage due to mis-operation of the pyrolysis unit.

DETAILED DESCRIPTION OF THE DRAWINGS

The invention may be best described from the drawings.

Figure 1:
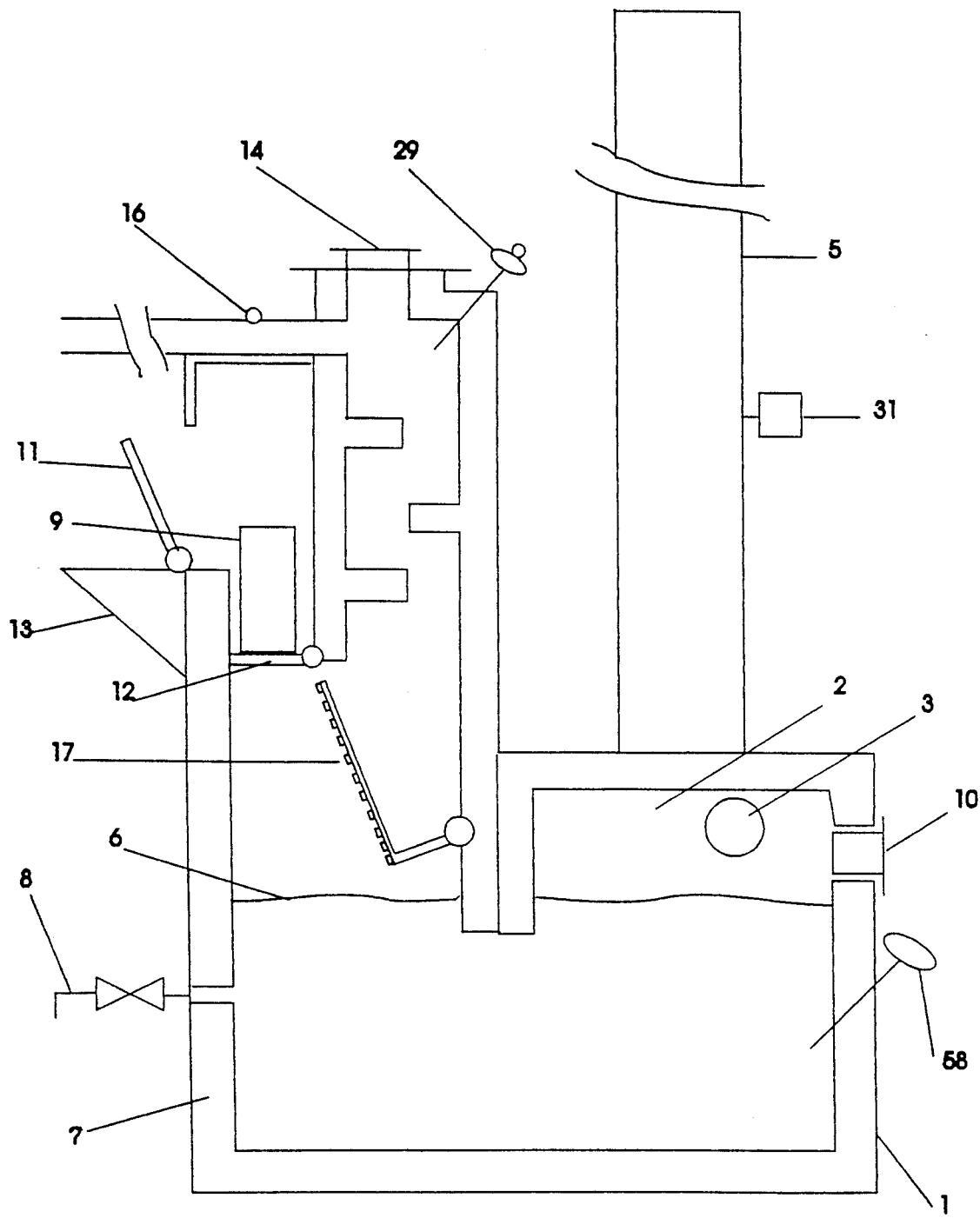
FIG. 1 shows the pyrolysis unit.

In FIG. 1 we show a section view of a preferred embodiment of the brick lined pyrolysis unit 1 which is the first unit of the process. The preferred outer metal shell is a high melting stainless steel. The pyrolysis unit 1 could also be lined with a high temperature refractory material or fabricated from special metal alloy. In the pyrolysis unit 1 the first compartment of firebox compartment 2 is heated by the burner 3. Burner 3 heats alloy metal charged through port 10 to form a molten alloy held at level 6. Molten alloy underflows the baffle between the two compartments into the second or pyrolysis compartment 4.

Figure 4:
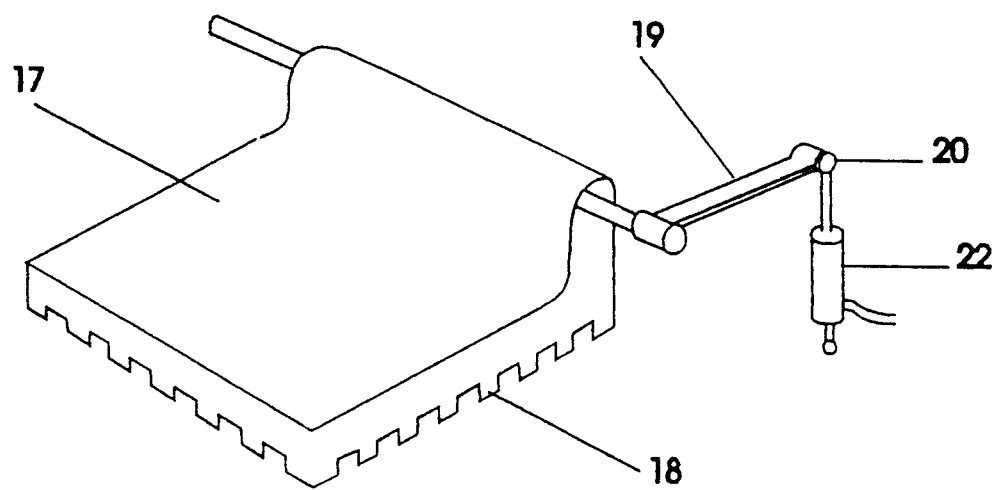
FIG. 4 shows a detail of a plunger unit in the pyrolysis unit.
Figure 5:
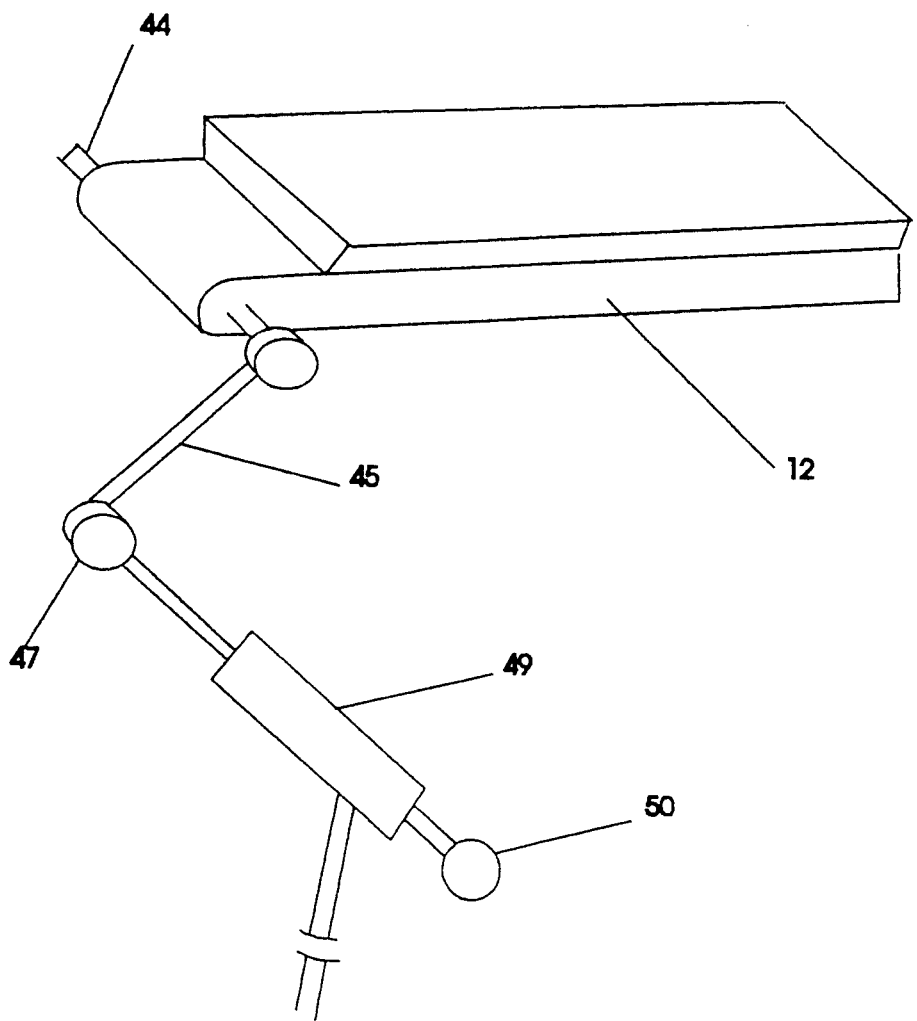
FIG. 5 shows detail of hydraulic driven dumper gate.

The alloy composition may be varied as follows for particular type wastes:
Aluminum: 90–99 percent
Calcium: 0–5 percent
Zinc: 0–5 percent
Iron: 0–5 percent
Copper: 0–5 percent The dunking unit 7 is designed to receive one or more biomedical waste containing boxes or packages 9 above dump door 12. Dump door 12 is hydraulically activated as shown in FIG. 5. With dump door 12 closed and after charge door 11 is closed an inert gas purge 15 is opened to maintain a slight positive pressure in dunking system 7. Carbon dioxide may be used for the inert gas purge. Hydraulic drive 49, FIG. 5, for dump door 12 is interlocked with hydraulic drive 22, FIG. 4 for plunger 17. After dump door 12 is opened plunger 17 moves downward to submerse box 9 into the molten metal. The box 9 will crush but will be totally under plunger 9, which preferably is sized to loosely cover the area in compartment 2. The plunger 9, in a preferred embodiment, is steel covered with ceramic and has a waffled face 18 as shown in FIG. 4. The hydraulic driver 22, FIG. 4 is controlled to submerse the waffled face 18 a minimum of ½ of an inch to insure all products of decomposition come into intimate contact with the molten alloy thereby being heated above the 250° C. which insures destruction of any pathogens. Temperature sensor 29 which in preferred embodiment leads to a recorder on the control panel 56, FIG. 6, indicates where changes are needed to assure a pathogen destruction temperature. It may be necessary to slow the feed rate or increase the alloy temperature. The boxes 9 are shown as manually fed but automatic feed equipment that could be properly interlocked by automating opening and closing of charge door 11 is well known and would be within the purview of the invention.

Inspection port 14 would preferably be bolted closed, but removable for clean out of possible carbon build up. Drain line 8 would be electrically heated to allow drawing off molten glass that accumulates on the alloy surface. Alternatively, a clean out door to allow manual skimming of the molten glass could be used.

Figure 6:
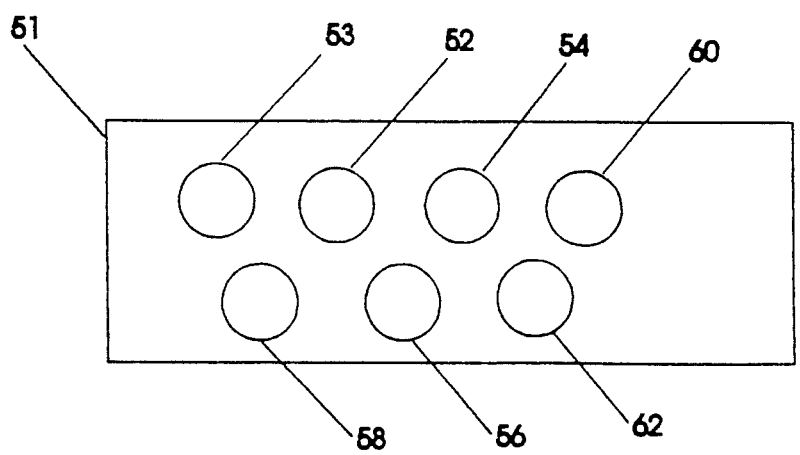
FIG. 6 shows the control panel.

Oxygen analyzer 31 indicates oxygen in the stack gas on recorder 60, FIG. 6, and should be held at essentially zero to minimize slag formation in the alloy in the compartment. Charcoal or carbon could be fed into compartment 1 to minimize slag build up by reduction of aluminum oxides.

Figure 2:
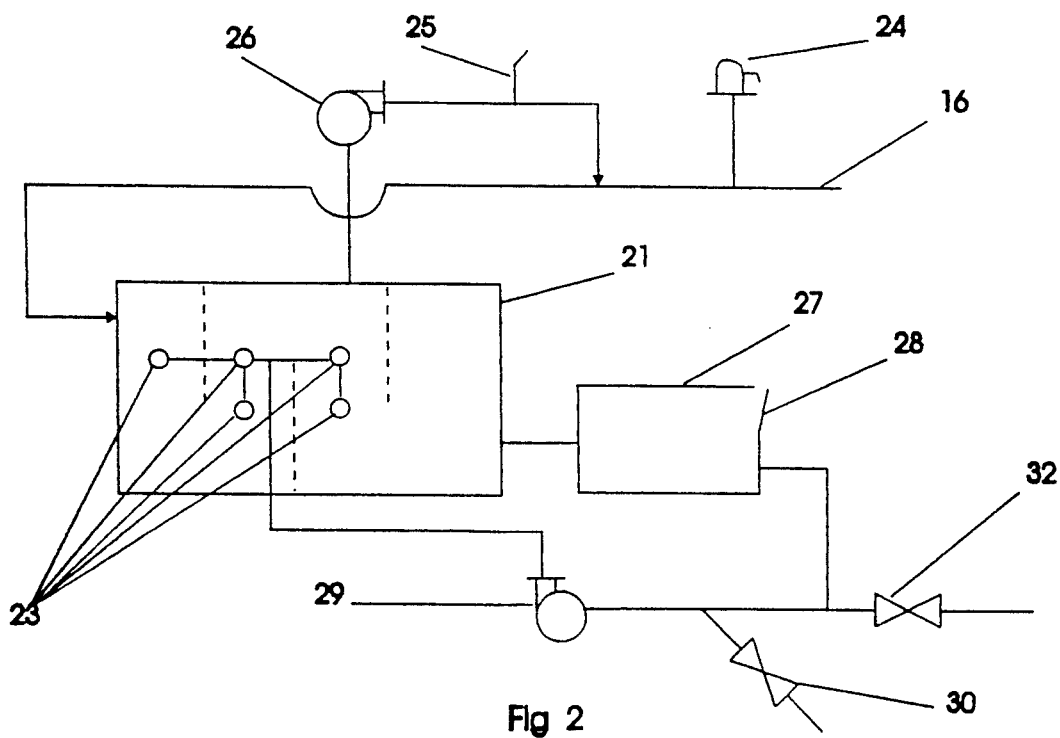
FIG. 2 shows first embodiment of the remainder of the process.

In FIG. 2 we have shown the remainder of the process for one preferred embodiment of the invention. Off gas 16 joins with recycle gas from blower 26 to feed into a baffled scrubber 21. Scrubbing is provided by a minimum of three full cone spray nozzles in the baffled compartments in scrubber 21. Water and carbon, which may be both floating and as a slurry, gravity flows into carbon separator 27. Carbon may be removed through clean out port 28 while water recycles back through the water recycle pump 29 and filter 40. Hydrogen and nitrogen bleed off vent 25. Relief valve 24 is quite large and is set to open with a minimum pressure necessary to overcome pressure drop in the piping. This minimizes pressure in the refractory lined pyrolysis unit.

Figure 3:
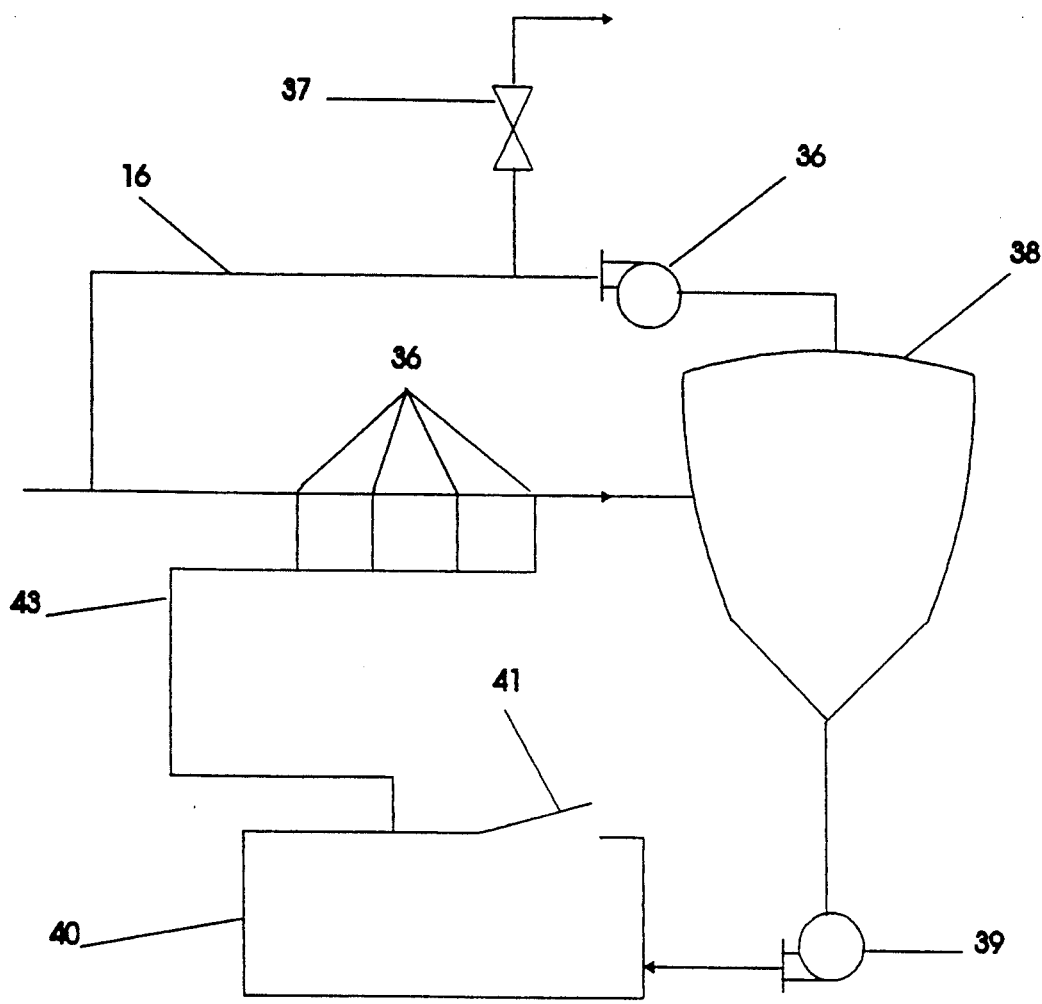
FIG. 3 shows a second embodiment of the remainder of the process.

In FIG. 3, we show an alternate embodiment of a scrubbing unit to replace 21, FIG. 2. In this embodiment, water is sprayed into off gas 16 through spray nozzles 38 prior to entrance into cyclone separator 35. Gas from cyclone separator 35 may be recycled through blower 36 to have sufficient velocity for good separation in the cyclone separator. Excess gas, comprising mainly nitrogen and hydrogen, may be vented through vent line 37. A carbon slurry draw off from the separator feeds to the suction of pump 39 to pump through filter 40. A dual closed Andale TM filter or similar filter with clean out ports to lift out carbon is preferred. Recycle water 43 feeds into the spray nozzles 38.

In FIG. 4 we show more detail of ceramic plunger 18 with serrations to form a face 18 similar to a waffle iron to guarantee intimate contact of relatively small off gas bubbles with the molten alloy during pyrolysis. Other designs to completely submerge a package or crushed box and to insure intimate contact of pyrolysis products with the molten alloy would be within the purview of the invention. Drive arm 19 is rigidly attached to plunger 17 to allow use of hydraulic cylinder 22 to rotate drive arm 19 through pivotal attachment 20.

In FIG. 5 we show a ceramic dump door or gate 12 with a beveled face to make a seal as the gate is closed up into dunking chamber 7. Drive arm 45 is rigidly attached to pivot rod 44. Operation of hydraulic cylinder 49, which is rotatably attached to a sidewall of pyrolysis unit 1 at point 50, raises or lowers gate 12 through pivotal attachment 47 to drive arm 45. Operation of hydraulic cylinder 49 is automated and interlocked with operation of ceramic plunger 18 in a normal manner.

In FIG. 6 we show the control panel 51. In a preferred embodiment all instruments on the panel give both a visual and recorded readout. Burner control 53 controls fuel flow to the burner 3, FIG. 1 and inlet air flow is adjustably ratioed to the fuel flow. Burner control 53 is automatically adjusted to maintain a molten metal temperature 58 of about 850° C. A setting of a minimum of 850° C. is preferred as any calcium carbonate formed by reaction of carbon dioxide with calcium in the alloy decomposes at this temperature. Dumper control 52 and plunger control 54 are interlocked so that plunger 17 is in a raised position before dumper gate 12 is opened by operation of an electrical switch (not shown) but located on Unit 1. The switch may be manually operated or operated by an automatic feed system which is also not shown, but easily designed. Gauge 60 indicates oxygen in the stack gas and should be held very close to zero percent by adjustment of the fuel air mixture ratio. Gauge 52 indicates spray nozzle pressure and may be interlocked with fuel flow to shutdown the unit if, for any reason, the water flow to the spray nozzles 23, FIG. 2, ceases. This prevents unscrubbed gas from going to the atmosphere. Pyrolysis exit gas temperature 56 provides a record to indicate that all off gas from the pyrolysis reaches a minimum temperature of 250° C. to make certain all pathogens are destroyed.

What is claimed is:

1. A process and equipment for treating packaged biomedical waste comprising:
   a) heating in a first compartment of a pyrolysis unit, a reactive alloy means to approximately 850° C. to form a molten liquid; said molten liquid flowing under a baffle into a second compartment of said pyrolysis unit;
   b) submersing said packaged biomedical waste into said molten liquid in said second compartment using a ceramic plunger means to cause off-gas from decomposition of said biomedical waste to become heated to above 250° C. before escaping from under said plunger means;
   c) circulating said off-gas through an aqueous scrubber;
   d) separating carbon from effluent from said aqueous scrubber in a carbon separator and recycling aqueous effluent from said separator to said aqueous scrubber;

e) venting non-condensible gases from said aqueous scrubber to maintain essentially atmospheric pressure in said scrubber.

2. A process and equipment for treating packaged biomedical waste as in claim 1 wherein said reactive alloy means comprises:
90–100% aluminum
0–5% calcium
0–5% zinc
0–5% iron
0–5% copper.

3. A process and equipment for treating packaged biomedical waste as in claim 1 wherein said reactive alloy means comprises:
90–98% aluminum
0–5% calcium
0–5% zinc
0–5% iron
0–5% copper.

4. A process and equipment for treating packaged biomedical waste comprising:
   a) heating a reactive alloy means in a first chamber of a pyrolysis unit to approximately 850° C. to form a molten liquid; said molten liquid under flowing into a second chamber of said unit;
   b) submersing a package of said packaged biomedical waste in said molten liquid in said second chamber with submersing means so designed that pyrolysis products from pyrolysis of said package are heated a minimum of 250° centigrade in said second chamber;
   c) scrubbing pyrolysis products exiting said second chamber in a recirculating aqueous scrubber;
   d) separating carbon from liquid effluent from said aqueous scrubber in a carbon separator means and recirculating liquid from said separator means to said recirculating scrubber;
   e) venting scrubbed gases to maintain essentially atmospheric pressure in said separator, said scrubber and said pyrolysis unit.

5. A process and equipment for treating packaged biomedical waste comprising:
   a) an equipment means for a process to pyrolyze said packaged biomedical waste and separate molten glass, pyrolyzed metals and carbon formed, and vent gases formed by said pyrolysis; said equipment means comprising:
      1) a dual compartment with a high temperature refractory lined chamber;
      2) a burner means in a first compartment of said chamber to heat a reactive alloy to maintain said alloy as a molten liquid at about 850° C. minimum;
      3) a baffle means between said first compartment and a second compartment in said dual compartment chamber; said baffle means allowing flow of said molten liquid between said first and said second chamber;
      4) a feeding and submersing means in said second compartment to feed and submerge a package of said packaged waste in said molten liquid in such a manner as to heat all off gas from resultant pyrolysis of said package to a minimum of 250° C.;
      5) a recirculating aqueous scrubber means to scrub said off gas;
      6) a carbon separator means to separate carbon from an effluent from said scrubber.

6. A process and equipment for treating packaged biomedical waste as in claim 5 wherein said first compartment is equipped with a sealable door to allow space for manually removing liquid glass from a top surface of said reactive alloy.

7. A process and equipment for treating packaged biomedical waste as in claim 5 further comprising a purge system to purge said feeding means and said second chamber with an inert gas.

8. A process and equipment for treating packaged biomedical waste as in claim 5 wherein said recirculating aqueous scrubber means is a baffled chamber with a minimum of one aqueous spray nozzle in each compartment of said baffled chamber and wherein said carbon separator means comprises a chamber with a clean out port to remove floating carbon and a filter to remove carbon in a slurry form.

9. A process and equipment for treating packaged biomedical waste as in claim 5 wherein said recirculating aqueous scrubber means comprises a cyclone separator, a recirculating water pump and a filter.

10. A process and equipment for treating packaged biomedical waste as in claim 9 wherein said recirculating aqueous scrubber means further comprises a gas circulating pump means and a pressure controlled vent line; said gas circulating pump means acting to recirculate sufficient gas for efficient operation of said cyclone separator means.

* * * * *